(12) United States Patent
Monden (10) Patent No.: US 7,043,083 B2
(45) Date of Patent: May 9, 2006

(54) PATTERN-COLLATING DEVICE, PATTERN-COLLATING METHOD AND PATTERN-COLLATING PROGRAM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 770 days.

(21) Appl. No.: 10/103,488

(22) Filed: Mar. 22, 2002

(65) Prior Publication Data

US 2002/0176627 A1    Nov. 28, 2002

(30) Foreign Application Priority Data

Mar. 28, 2001  (JP) .............................. 2001-092246

(51) Int. Cl.
*G06K 9/68* (2006.01)

(52) U.S. Cl. ....................... 382/219; 382/116; 382/125
(58) Field of Classification Search ................ 382/219, 382/116, 125
See application file for complete search history.

(56) References Cited

U.S. PATENT DOCUMENTS

| 6,072,903 | A  | * | 6/2000 | Maki et al. ................. 382/190 |
| 6,185,318 | B1 |   | 2/2001 | Jain et al. |
| 6,580,821 | B1 | * | 6/2003 | Roy ........................... 382/154 |
| 6,591,011 | B1 | * | 7/2003 | Nielsen ...................... 382/218 |

FOREIGN PATENT DOCUMENTS

| EP | 0866424 A2  | 9/1998 |
| JP | 59-24384 A  | 2/1984 |
| JP | 63-13226 B2 | 3/1988 |
| JP | 63-21233 B2 | 5/1988 |
| JP | 63-36033 B2 | 7/1988 |
| JP | 3-266187 A  | 11/1991 |
| JP | 4-33065 A   | 2/1992 |
| JP | 10-124669 A | 5/1998 |
| JP | 11-110542 A | 4/1999 |
| JP | 2949788 B2  | 7/1999 |
| JP | 3002721 B2  | 11/1999 |

OTHER PUBLICATIONS

Jain A, et al. "On-line Fingerprint Verification" IEEE Transactions on Pattern Analysis and Machine Intelligence, IEEE Inc. New York, US, vol. 19, No. 4, Apr. 1997, pp. 302-313, XP000690650 ISSN: 0162-8828.

Shinki Umeyama: " A Point Pattern Matching Algorithm" Systems & Computers in Japan, Scripta Technica Journals. New York, US, vol. 20, No. 10, Oct. 1, 1989, pp. 95-106, XP 000128838, ISSN: 0882-1666.

* cited by examiner

*Primary Examiner*—Bhavesh M. Mehta
*Assistant Examiner*—Gregory Desire
(74) *Attorney, Agent, or Firm*—Sughrue Mion, PLLC

(57) ABSTRACT

The pattern-collating device includes as feature point pairs, among feature points which are portions indicating respective features of an examination target graphic which is the graphic to be compared and a model graphic which is the reference graphic, those which mutually correspond in said examination target graphic and said model graphic and a similarity determination section which calculates the similarity between the examination target graphic and the model graphic based on correspondence of the feature points by the feature point pair formation section, wherein the similarity determination section calculates the similarity between the examination target graphic and the model graphic based on a probability that the number of the feature point pairs between an arbitrary graphic and the model graphic, is not less than the number of the feature point pairs between the examination target graphic and the model graphic previously obtained by the feature point pair formation section.

18 Claims, 6 Drawing Sheets

PATTERN-COLLATING DEVICE, PATTERN-COLLATING METHOD AND PATTERN-COLLATING PROGRAM

BACKGROUND OF THE INVENTION

1. Field of the Invention

The present invention relates to a collating of image data. More particularly, the present invention relates to a pattern-collating device, a pattern-collating method and a pattern-collating program for identifying a line graphic such as a fingerprint, palm print and a character.

2. Description of the Related Art

As conventional collating device for recognizing a pattern of a line graphic such as a fingerprint, palm print or a character, a method of obtaining corresponding feature points by using feature points such as end points of a line or branch points and comparing them is described in Japanese Patent Application Laid-Open (referred to as JP-A hereinafter) Nos. 56-024675, 59-000778, 59-024384, 60-029875, 03-266187, 04-033065 and 04-043470.

However, the conventional technique mentioned above has the following disadvantages.

The method described in the JP-A Nos. 56-024675, 59-000778, 59-024384, 60-029875, 04-033065 and 04-043470 is a method to examine corresponding feature points and to identify based on the number of the corresponding feature points. Due to this, it is easy to form feature point pairs at locations at which feature points are crowded and there exist a problem that it is impossible to accurately compare the result if feature points have different densities among targets and/or models.

According to the method described in JP-A No. 03-266187, those with a large number of feature points adjacent to a certain feature point are invalidated to thereby deal with a case where the density of feature points is high. According to this method, however, if there are only locations at which the density of feature points is high, there exist a problem that it is impossible to identify.

SUMMARY OF THE INVENTION

It is an object of the present invention to provide a pattern-collating device, a pattern-collating method and a pattern-collating program capable of solving the disadvantages of the conventional technique stated above and accurately identifying a inputted graphic without depending on the density of feature points of the inputted graphic.

According to the present invention, there is provided a pattern collating device for collating an examination target graphic with a model graphic, comprising: feature point pair formation means for making feature point pairs, each of which is composed of a feature point in the examination target graphic and a feature point in the model graphic which correspond to each other, the feature point in the examination target graphic which composes each of the feature point pair being selected from points which indicate feature of the examination target graphic, the feature point in the model graphic which composes each of the feature point pair being selected from points which indicate feature of the model graphic: probability calculation means for calculating a probability that a number of feature point pairs between an arbitrary graphic and the model graphic is not less than a number of the feature point pairs between the examination target graphic and the model graphic, similarity calculation means for calculating similarity between the examination target graphic and the model graphic on the basis of the probability.

The pattern collating device may further comprise: feature quantity calculation means for calculating feature quantity between the examination target graphic and the model graphic; and consistency calculation means for calculating consistency of feature point pairs between the examination target graphic and the model graphic based on the number of feature point pairs between the examination target graphic and the model graphic and the feature quantity between the examination target graphic and the model graphic, wherein the probability calculation means calculates a probability that consistency between the arbitrary graphic and the model graphic is not less than the consistency between the examination target graphic and the model graphic, instead of the probability that the number of feature point pairs between the arbitrary graphic and the model graphic is not less than the number of the feature point pairs between the examination target graphic and the model graphic.

The pattern collating device may further comprise: second feature quantity calculation means for calculating feature quantity between the model graphic and a graphic which is the same as the model graphic; and consistency calculation means for calculating consistency of feature point pairs between the model graphic and the graphic which is the same as the model graphic based on the number of feature point pairs between the model graphic and the graphic which is the same as the model graphic and the feature quantity between the model target graphic and the graphic which is the same as the model graphic, wherein the similarity calculation means calculates the similarity between the examination target graphic and the model graphic on the basis of the probability that consistency between the arbitrary graphic and the model graphic is not less than the consistency between the examination target graphic and the model graphic and a probability that the consistency between the model graphic and the graphic which is the same as the model graphic is less than the consistency between the examination target graphic and the model graphic.

The pattern collating device may further comprise: feature quantity calculation means for calculating feature quantity difference of feature point pairs between the examination target graphic and the model graphic; means for reducing the number of feature point pairs between the examination target graphic and the model graphic to a number of feature point pairs of which the quantity difference is less than a predetermined value; means for reducing the number of feature point pairs between the arbitrary graphic and the model graphic by eliminating feature point pairs of which the quantity difference is not less than the predetermined value, and wherein the probability calculation means calculates a probability that the reduced number of feature point pairs between an arbitrary graphic and the model graphic is not less than the reduced number of feature point pairs between the examination target graphic and the model graphic, instead of the probability that the number of feature point pairs between the arbitrary graphic and the model graphic is not less than the number of the feature point pairs between the examination target graphic and the model graphic.

In the pattern collating device, the quantity difference may be a distance between feature points composing the feature point pair.

In the pattern-collating device, at least one of a fingerprint and a palm print may be used as the examination target graphic and the model graphic.

According to the present invention, the similarity between the examination target graphic and the model graphic using the probability that the feature point pairs between the arbitrary graphic assumed to be inputted and the model graphic are consistent, is calculated. That is, if there are many corresponding feature point pairs between the examination target graphic and the model graphic, and the probability that such correspondence occurs when an arbitrary graphic is used as object is sufficiently low, then it is determined that the probability that the examination target graphic is the same as the model graphic is extremely high. It is, therefore, possible to appropriately identify the examination target graphic and the model graphic based on a certain criterion without being influenced by the density of the feature points of the examination target graphic and the model graphic.

DESCRIPTION OF THE PREFERRED EMBODIMENTS

The embodiments of the present invention will be described hereinafter in detail with reference to the drawings.

Figure 1:
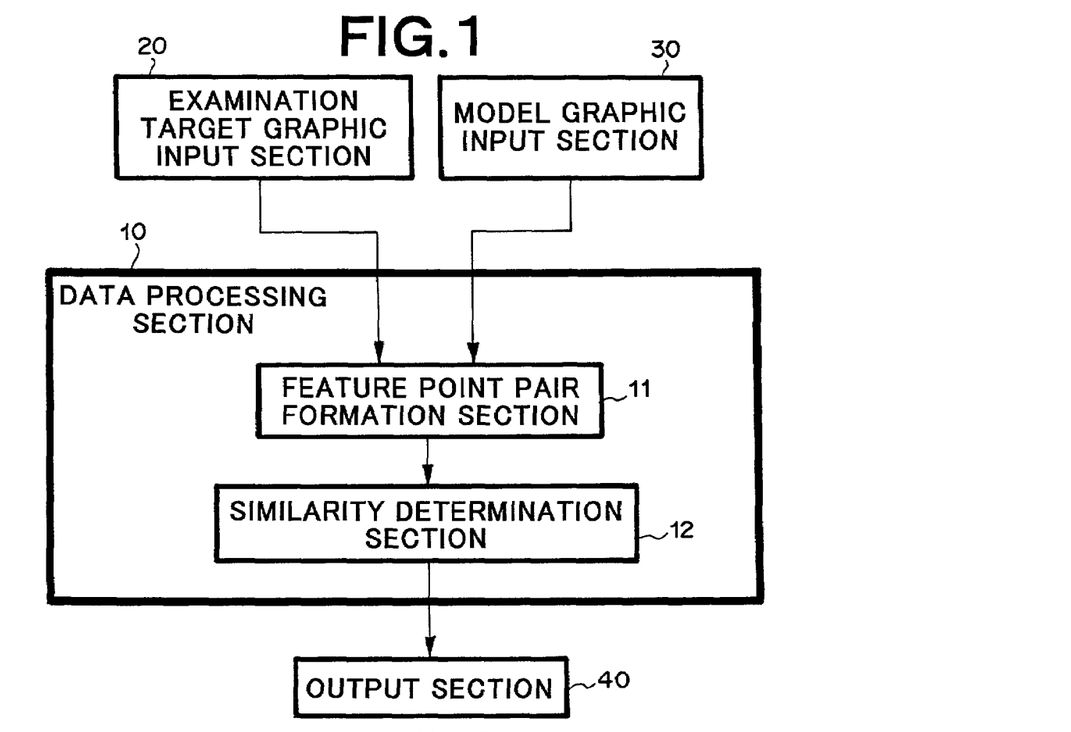
FIG. 1 is a block diagram showing the configuration of a pattern-collating device according to a first embodiment of the present invention.

FIG. 1 is a block diagram showing the configuration of a pattern-collating device according to the first embodiment of the present invention.

Referring to FIG. 1, a pattern-collating device in the present embodiment includes an examination target graphic input section 20 which inputs data on an examination target graphic which is a graphic to be compared, a model graphic input section 30 which inputs data on a model graphic which is a reference graphic, a data processing section 10 which calculates the similarity between the examination target graphic and the model graphic, and an output section 40 which outputs a processing result.

The data processing section 10 includes a feature point pair formation section 11 which pairs together the feature point of the examination target graphic and the corresponding feature point of the model graphic, and a similarity determination section 12 which calculates the similarity between the examination target graphic and the model graphic based on the feature point pairs. The outline of the operations of the respective constituent elements of the data processing section 10 will be described below.

The feature point pair formation section 11 compares the feature points of the examination target graphic which is inputted from the examination target graphic input section 20 with the feature points of the model graphic which is inputted from the model graphic input section 30, and finds corresponding feature points. A pair of the corresponding feature points in both graphics will be referred to as a feature point pair.

The similarity determination section 12 calculates the similarity between the examination target graphic and the model graphic based on a probability that the number of feature point pairs between an arbitrary graphic and the model graphic is not less than the number of feature point pairs between the examination target graphic and the model graphic previously obtained by the feature point pair formation section 11. That is, the similarity determination section 12 calculates a probability that the number of the feature points of an arbitrary graphic arbitrarily selected from all the graphics assumed to be inputted which are consistent with the feature points of the model graphic within a threshold value based on which the feature point pair formation section 11 determines the pairs, is not less than the number of the feature point pairs between the examination target graphic and the model graphic. Based on this, similarity is calculated.

The calculated similarity is outputted by the output section 40.

The operation of this embodiment will be described in detail with reference to the drawings.

Figure 2:
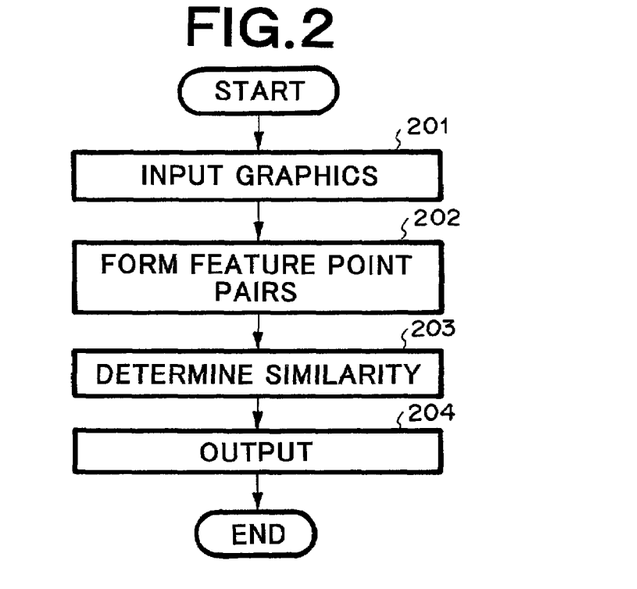
FIG. 2 is a flow chart for explaining a pattern-collating processing according to the first embodiment.

FIG. 2 is a flow chart for explaining a pattern-collating processing according to this embodiment.

First, feature point information on the examination target graphic is inputted into the examination target graphic input section 20, and feature point information on the model graphic which is the graphic to be compared, is inputted into the model graphic input section 30 (step 201).

To input the respective graphics, a method of inputting information on feature points which indicate the features of the respective graphics and have been extracted in advance, or a method of inputting image data on the respective graphics, extracting information on the feature points in the examination target graphic input section 20 and the model graphic input section 30, and transmitting it to the data processing section 10, for example, can be used.

If it is applied to, for example, character recognition, a method of inputting image data on a character to be examined to identify the character, into the examination target graphic input section 20 and inputting character data registered with a dictionary into the model graphic input section 30 can be used.

If it is applied to, for example, fingerprint recognition, palm print recognition, image data on a fingerprint or a palm print to be examined to identify the person of the fingerprint or the palm print is inputted into the examination target graphic input section 20 and fingerprint data registered with a fingerprint database or palm print database may be inputted into the model graphic input section 30.

As can be seen, the examination target graphic input section 20 may input feature point information on the examination target graphic extracted in advance or may input the examination target graphic itself and extract feature point information at the examination target graphic input section 20. Likewise, the model graphic input section 30 may input feature point information on the model graphic extracted in advance or may input the model graphic itself and extract feature point information at the model graphic input section 20.

Here, the feature points of the examination target graphic and the model graphic may be points (end points) at which a line is broken, branched points (branch points), crossing points (crossings) or the like. In addition, as feature quantity which serves as data indicating the feature degree of the respective feature points, data such as the positions of the feature points, the directions of tangent lines or the like may be used. Further, information on the values of curvatures of contacting lines and adjacent lines, the arrangement of adjacent feature points, the number of lines crossing between the adjacent feature points or the like may be added to the feature quantity.

The feature point pair formation section 11 compares feature point information on the examination target graphic inputted from the examination target graphic input section 20 with the feature point information on the model graphic inputted from the model graphic input section 30, selects feature points considered to be identical and forms data on feature point pairs (step 202).

The determination processing of this feature point pair formation section 11 as to whether or not it is an identical feature point, can be carried out by calculating the positional difference between the feature points when the examination target graphic is superposed on the model graphic, determining whether or not the difference in feature quantity between the respective feature points is within a predetermined threshold value, calculating a value for estimating the similarity degree of the feature points using data on the positional difference or the respective feature quantity difference as the argument of a predetermined function, or the like.

Figure 3:
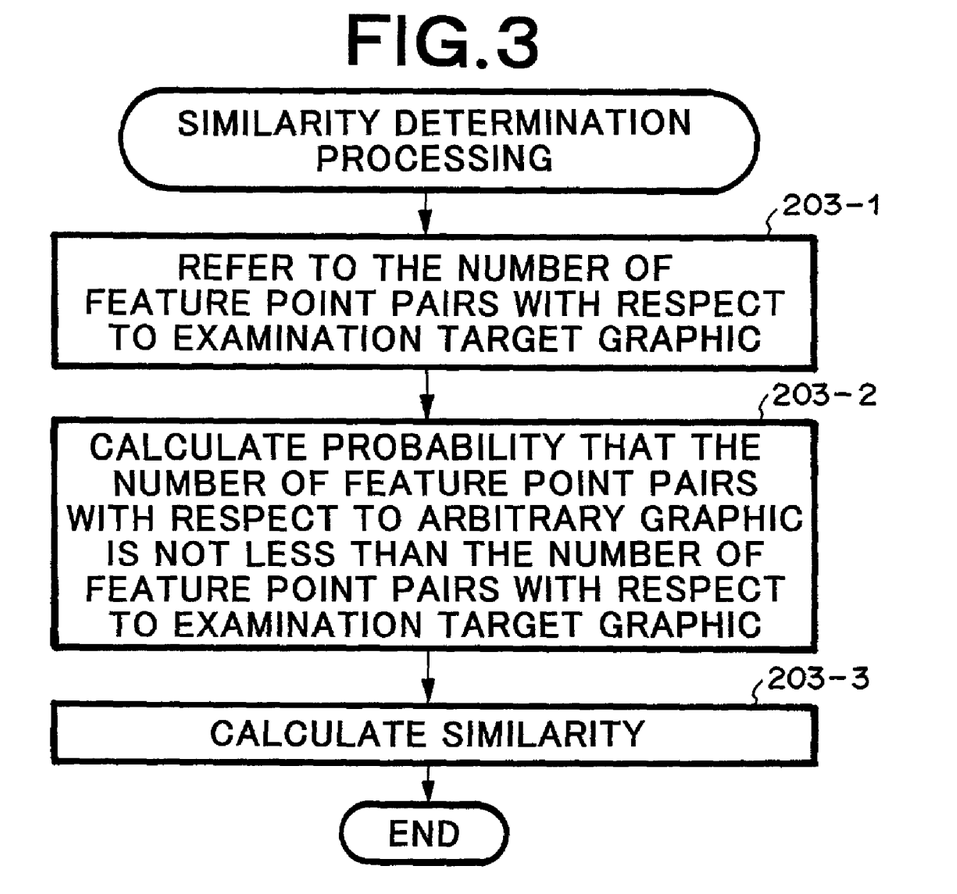
FIG. 3 is a flow chart for explaining one embodiment of a similarity determination processing according to the first embodiment.

The similarity determination section 12 calculates the similarity between the examination target graphic and the model graphic based on a probability that the number of the feature point pairs between the arbitrary graphic and the model graphic is not less than the number of the feature point pairs between the examination target graphic and the model graphic previously obtained by the feature point pair formation section 11 (step 203). FIG. 3 is a flow chart for explaining one embodiment of the similarity determination processing in this embodiment executed in the step 203. Referring to FIG. 3, the number of the feature point pairs with respect to the examination target graphic is referred (step 230-1). Next, a probability that the number of the feature point pairs with respect to the arbitrary graphic (which is an arbitrary graphic assumed to be inputted) is not less than the number of the feature point pairs with respect to the examination target graphic is calculated (step 203-2). Based on this probability, similarity is calculated (step 203-3). Here, the probability calculated in the step 203-2, i.e., the probability that the number of the feature points consistent with those of the model graphic within the threshold value on which they are determined as pairs, is not less than the number of the feature point pairs formed in the feature point formation section 11, can be calculated in, for example, the following manner.

In this example, only the positional difference in feature points is used as the criterion of forming feature point pairs. By way of example, a method of determining a feature point pair when the examination target graphic is superposed on the model graphic and the positional difference between them is not more than a predetermined length E, will be described. In addition, it is assumed that the area of the model graphic is S, the examination target graphic has $N_1$ feature points and the model graphic has $N_2$ feature points and that M feature points among them form feature point pairs. Now, the entire graphic in which $N_1$ feature points are arbitrarily arranged is considered as the entire examination target graphic assumed to be inputted.

The position of a certain feature point of a graphic arbitrarily selected from the graphic in which feature points are arbitrarily arranged, is equivalent to that when they are arranged at random. Due to this, a probability $P_0$ that a certain feature point, which is arranged at random in the model graphic, has not more than an error E relative to a certain feature point among the feature points of the model graphic, is obtained by the following equation 1.

$$P_0 = \frac{\pi E^2}{S} \qquad (1)$$

Therefore, a probability $P_1$ that the certain feature point has not more than the error E relative to one of the $N_2$ feature points of the model graphic is obtained by the following equation 2 when the feature points in the model graphic are sufficiently non-dense and an overlapped region having not more than the distance E from each feature point in the model graphic is negligibly small.

$$P_1 = N_2 \cdot \frac{\pi E^2}{S} \qquad (2)$$

Further, a probability $P_2$ $(M_1)$ that $M_1$ feature points among the $N_1$ feature points, which are arranged in the model graphic at random, have not more than the distance E from feature points of the model graphic, can be obtained by the following equation 3 when $N_1$ is sufficiently small and a probability that not less than two feature points arranged at random have a distance not more than the distance E from the same feature point of the model graphic is negligibly small.

$$P_2(M_1) = {_{N_1}}C_{M_1} \cdot P_1^{M_1} \cdot (1 - P_1 \cdot N_1)^{(N_1 - M_1)} \qquad (3)$$

Therefore, if we provide P(M) that represents a probability that not less than M feature points have not more than the distance E from the feature points of the model graphic when $N_1$ feature points are arranged in the model graphic at random, i.e., a probability that there are not less than M feature point pairs between the examination target graphic and the model graphic when the $N_1$ feature points of the examination target graphic are arranged in the model graphic at random, then a P(M) value can be obtained by the following equation 4.

$$P(M) = \sum_{i=M}^{N_1} P_2(i) \quad (4)$$

The similarity determination section 12 can use 1-P(M) as the value of the similarity between the examination target graphic and the model graphic or use a value of P(M) as an argument of a predetermined equation representing the similarity. In addition, a method of using a probability of consistency with the examination target graphic when the model graphic side is arranged at random or a method of using a value obtained by using this value and P(M) as arguments of a predetermined equation can be executed.

Furthermore, the similarity calculated by the similarity determination section 12 is not limited to the value calculated by the method described in the above embodiment. If there is another value that can be used in the calculation of similarity, a value obtained by using P(M) and the value thus obtained as arguments of a predetermined equation.

When each assumption used to derive the equation for obtaining P(M) is not established because the feature points in the model graphic are sufficiently non-dense or $N_1$ is sufficiently small, then it is possible to modify the equation in accordance with such a condition. In addition, when feature quantities other than positions are used and each feature quantity is randomly selected from a possible value, then it is possible to add the feature quantities, as a probability that falls within a predetermined range, to the model.

By way of example, an embodiment in which the directions of feature points in addition to the model employed as feature quantities is considered. In this case, each direction is randomly selected from 0 to $2\pi$ (rad). When the difference is within "A (rad)", it is determined as pairs. Namely, it is determined as pairs when the feature point of the examination target graphic is within a range of ±A(rad) from the direction of the feature point of the model graphic. Therefore, if the equation 2 and the equation 3 for obtaining the probability $P_1$ is modified to the following equation 5 and the equation 5 is assigned to the equation 4, then a probability when the feature point pairs between the examination target graphic and the model graphic is not less than M can be similarly calculated.

$$P_1 = N_2 \cdot \frac{\pi E^2}{S} \cdot \frac{2A}{2\pi} \quad (5)$$

Further, the similarity calculated by the similarity determination section 12 is outputted from the output section 40 (step 204).

As described so far, according to this embodiment, it is possible to accurately identify the graphic without depending on the density of the feature points of the inputted graphic.

A second embodiment of the present invention will next be described in detail with reference to the drawings.

Figure 4:
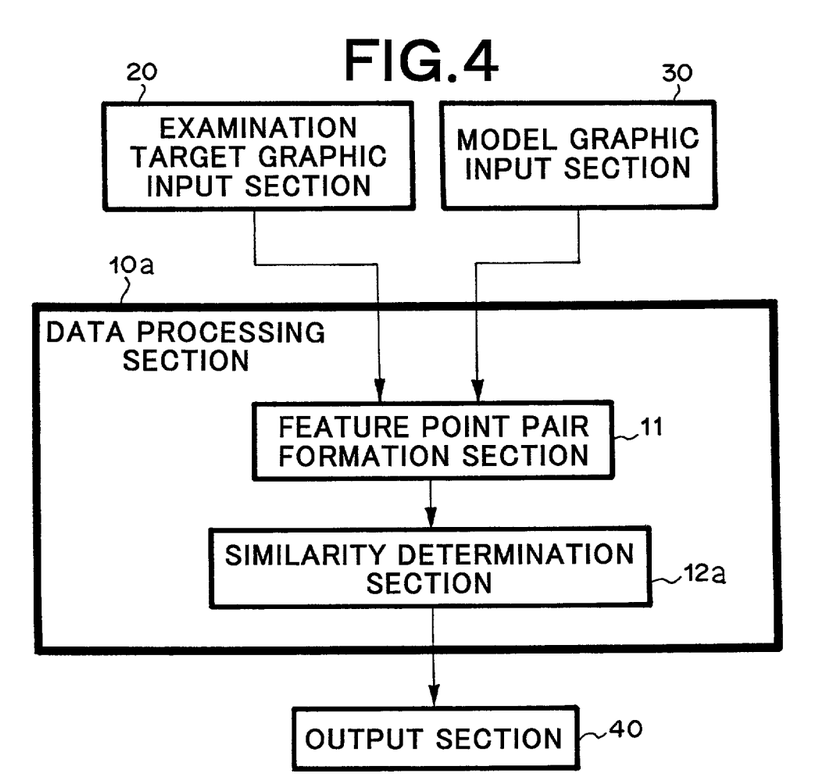
FIG. 4 is a block diagram showing the configuration of a pattern-collating device according to a second embodiment of the present invention.
Figure 5:
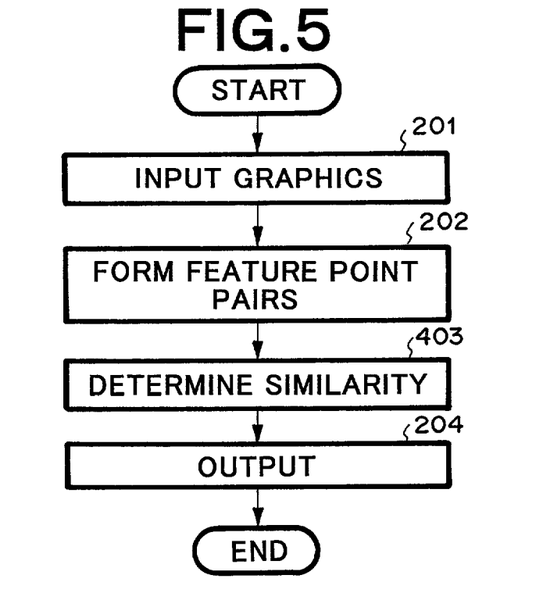
FIG. 5 is a flow chart for explaining a pattern-collating processing in the second embodiment.

FIG. 4 is a block diagram showing the configuration of a pattern-collating device according to the second embodiment. FIG. 5 is a flow chart for explaining a pattern-collating processing according to this embodiment.

As shown in FIGS. 4 and 5, the difference of the second embodiment from the first embodiment is a function of a similarity determination section 12a in a data processing section 10a. Since the procedures of the pattern-collating processing, other than similarity calculation in step 403 according to this embodiment, are the same as those in the preceding first embodiment, they will not be described herein.

In the similarity calculation (step 203) in the preceding first embodiment, the similarity between the examination target graphic and the model graphic is calculated based on the probability that the number of the feature point pairs between the arbitrary graphic and the model graphic is not less than the number of the feature point pairs between the examination target graphic and the model graphic previously obtained by the feature point pair formation section 11.

In the process of similarity calculation in the step 403 according to the second embodiment, by contrast, the similarity is calculated referring to not only the number of feature point pairs but also to data on a feature quantity which is a value indicating the feature degree of each feature point pair. That is, the similarity is calculated based on a probability that the value of consistency calculated while including the number of the feature point pairs between an arbitrary graphic and the model graphic and data on the feature quantities thereof is not less than the value of consistency calculated based on the number of the feature point pairs between the examination target graphic and the model graphic previously obtained by the feature point pair formation section 11 and the feature quantities thereof.

Figure 6:
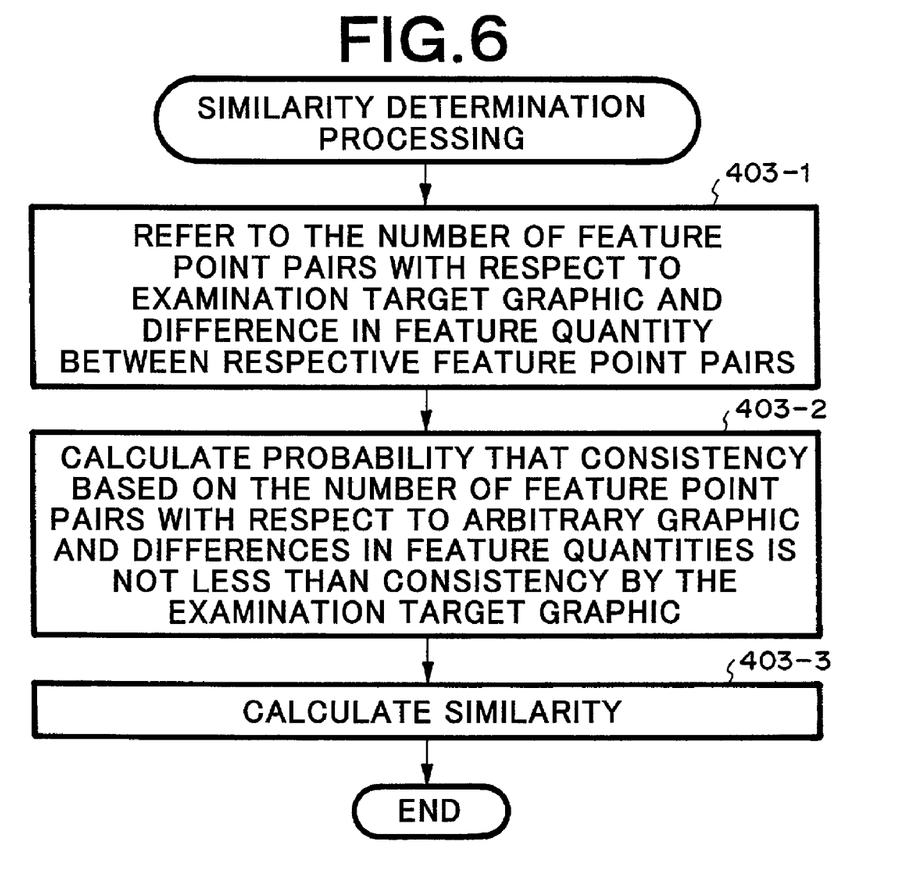
FIG. 6 is a flow chart for explaining one embodiment of a similarity determination processing according to the second embodiment.

FIG. 6 is a flow chart for explaining one embodiment of the similarity determination processing in the step 403 in this embodiment. Referring to FIG. 6, first, the number of the feature point pairs with respect to the examination target graphic and the difference in feature quantity between the feature point pairs is referred to (step 403-1). Next, a probability that consistency based on the number of the feature point pairs with respect to an arbitrary graphic (an arbitrary graphic assumed to be inputted) and the difference in feature quantity between the respective feature point pairs is not less than the consistency with respect to the examination target graphic, is calculated (step 403-2). Based on the probability, the similarity is calculated (step 403-3).

An example of a method of calculating the probability that the value of the consistency calculated based on the number of the feature point pairs between the arbitrary graphic and the model graphic and the feature quantities thereof is not less than the value of the consistency calculated based on the number of the feature point pairs between the examination target graphic and the model graphic and the feature quantities thereof, is shown below.

In this example, only the positional differences of feature points are used as the criterion of forming feature point pairs. By way of example, a method of determining a feature point pair when the examination target graphic is superposed on the model graphic and the positional difference between the feature points of them is not more than a predetermined length E, will be described. In addition, it is assumed that the area of the model graphic is S, the examination target graphic has $N_1$ feature points and the model graphic has $N_2$ feature points and that M feature points among them form feature point pairs. Now, all the graphics in which $N_1$ feature points are arbitrarily arranged is considered as all the examination target graphics assumed to be inputted. In addition, it is assumed that the positional difference between the M feature point pairs is expressed as $E_i$ (where i=1, ..., M).

A probability $P_2(D)$ that a certain point, which is randomly arranged in the model graphic having the area S, is arranged at a position having not more than a positional difference D from one of the feature points of the examination target graphic, can be obtained by the following equation 6.

$$P_2(D) = \frac{\pi D^2}{S} \tag{6}$$

Further, a probability $P_3$ that the certain point thus arranged does not have a positional difference not more than E from any feature point of the model graphic, can be obtained by the following equation 7.

$$P_3 = 1 - \frac{\pi E^2}{S} \cdot N_2 \tag{7}$$

A probability $P_4(M_2)$ that each of $M_2$ feature point pairs different from one another has not more than the positional difference Ei, when $N_1$ feature points are arranged in the model graphic at random, can be obtained by the following equation 8.

$$P_4(M_2) = {}_{N_2}P_{M_2} \cdot {}_{N_1}P_{M_2} \cdot P_3^{(N_1 - M_2)} \cdot \prod_{i=1}^{M_2} P_2(E_i) \tag{8}$$

In the equation 8, it is assumed that the value of $E_i$ (where i=1, ..., $M_2$) is the positional difference between the feature point pairs formed by the feature point pair formation means when i is not more than M, and it is the allowable error "E" of the position if the value i is more than M. By so defining, a probability $P_5$ that the number of feature points among the $N_1$ feature points arranged at random which are consistent with a part of the $N_2$ feature points of the model graphic, is not less than the M pairs formed by the feature point pair formation means, can be obtained by the following equation 9.

$$P_5 = \sum_{i=M}^{N_1} P_4(i) \tag{9}$$

When feature quantities other than the positions are used, they can be added to the model, as a probability that each feature quantity is within a predetermined range when selected from possible values at random.

The second embodiment described so far can be identified more strictly by using not only the number of the feature point pairs but also information on the difference in feature quantity between the feature point pairs, in addition to the effect of the first embodiment.

A third embodiment of the present invention will next be described in detail with reference to the drawings.

Figure 7:
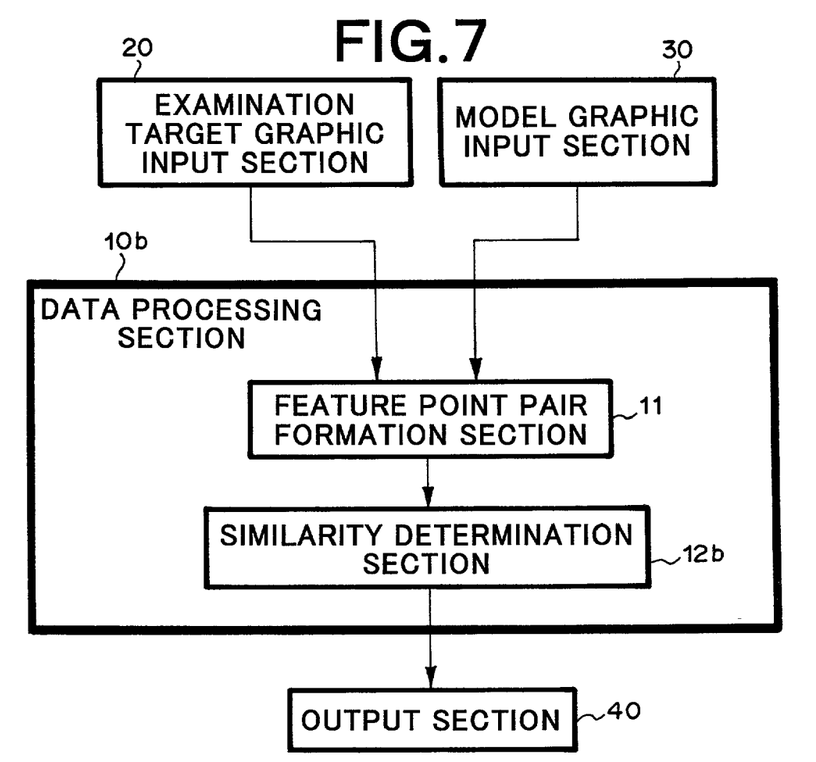
FIG. 7 is a block diagram showing the configuration of a pattern-collating device according to a third embodiment of the present invention.
Figure 8:
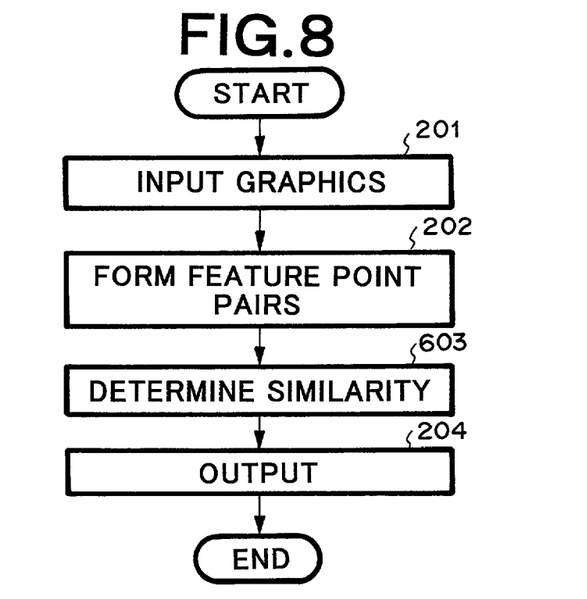
FIG. 8 is a flow chart for explaining a pattern-collating processing according to the third embodiment.

FIG. 7 is a block diagram showing the configuration of a pattern-collating device according to the third embodiment. FIG. 8 is a flow chart for explaining a pattern-collating processing according to this embodiment.

As shown in FIGS. 7 and 8, the difference of the third embodiment from the preceding each embodiment is a function of a similarity determination section 12b in a data processing section 10b. Since the procedures of the pattern-collating processing, other than similarity calculation in a step 604 in this embodiment, are the same as those in the preceding first embodiment, they will not be described herein.

Figure 9:
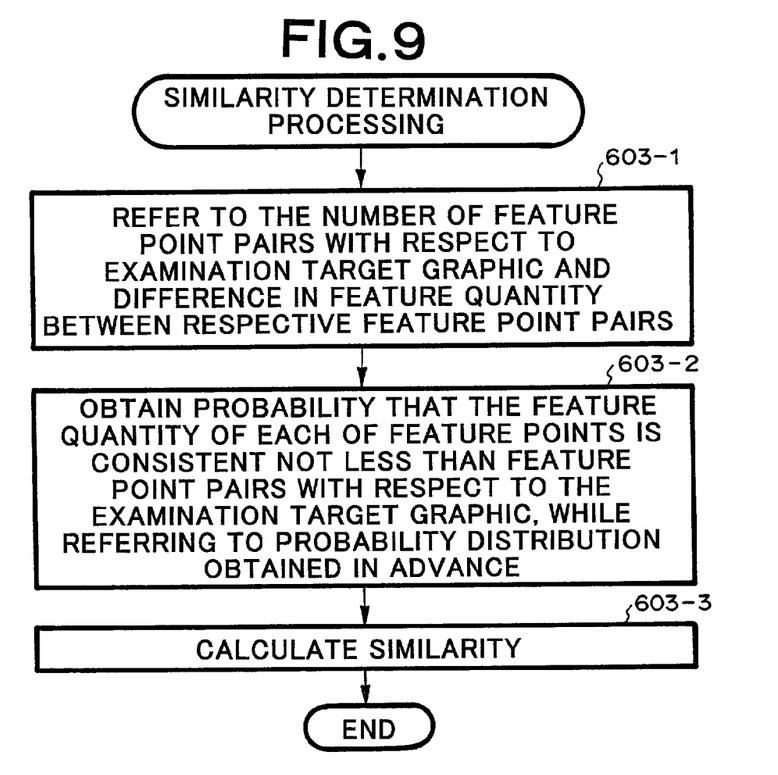
FIG. 9 is a flow chart for explaining one embodiment of a similarity determination processing according to the third embodiment.

FIG. 9 is a flow chart for explaining one embodiment of a similarity determination processing in the step 603 in this embodiment. Referring to FIG. 9, first, the number of feature point pairs with respect to an examination target graphic and the difference in feature quantity between the feature point pairs are referred to (step 603-1). Next, a probability that the feature quantities of the feature points are consistent, not less than the feature point pairs with respect to the examination target graphic, is obtained while referring to a probability distribution obtained in advance (step 603-2). Based on this probability, the similarity is calculated (step 603-3). A processing for calculating the probability in the step 603-2 in this embodiment will be described in more detail.

In the similarity calculation processing in the step 603, the same processing as the similarity calculation processing in each of the first and second embodiments (steps 203 and 403) is executed.

Thereafter, a probability $P_n$ that the arbitrary graphic and the model graphic are consistent not less than between the examination target graphic and the model graphic previously obtained by the feature point pair formation section 11, is obtained. Further, when the examination target graphic and the model graphic are the same graphic, the distribution of the differences in feature quantities between the corresponding feature points is obtained. Using this distribution, a probability $P_a$ that the examination target graphic, when the examination target graphic and the model graphic are the same graphic, is consistent only with those not more than the feature point pairs formed by the feature point pair formation section 11, is obtained.

A value, which is obtained by using $P_n$ and $P_a$ as arguments of a predetermined equation, is used as the similarity between the examination target graphic and the model graphic. The probability $P_a$ of consistency with those not more than the feature point pairs formed by the feature point pair formation section 11 can be obtained, for example, by the following equation 10 considering when only the positional differences between the feature points are used as the criterion of forming feature point pairs, a probability $P_6(F)$ that the positional differences between the corresponding feature points is not less than F, the examination target graphic has $N_1$, and the model graphic has $N_2$ feature points, M pairs among them form feature point pairs and that the positional difference between the respective feature point pairs is expressed as $E_i$ (where i=1, ..., M).

$$P_a = \prod_{i=1}^{M} P_6(E_i) \tag{10}$$

As described so far, according to the third embodiment, it is possible to accurately identify, when the feature quantity distribution of the feature points of the same graphic is known in advance, using the distribution for identification, in addition to the effect of the proceeding first embodiment.

Further, a combination of the similarity calculation processing in the second embodiment and the third embodiment can be executed.

Figure 10:
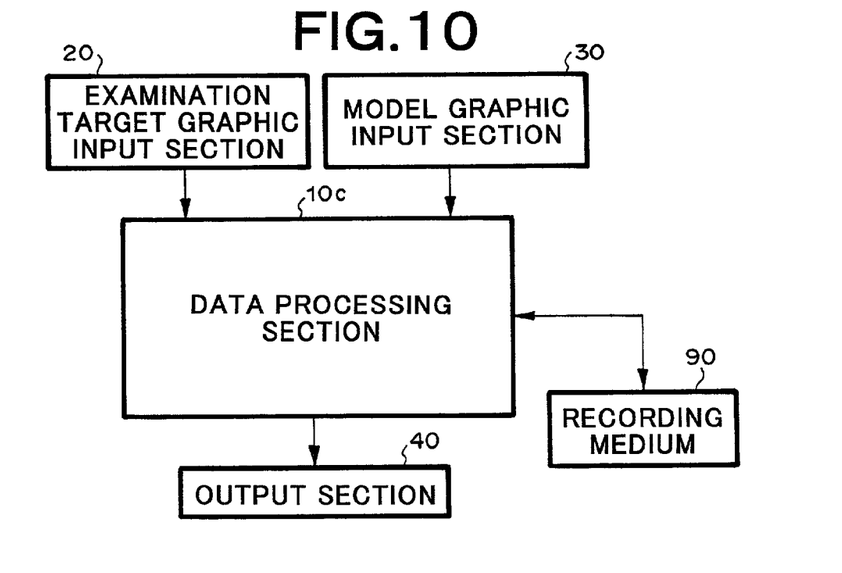
FIG. 10 is a diagram showing one embodiment of the configuration provided with a recording medium which records a pattern-collating program according to the present invention.

FIG. 10 is a diagram showing one embodiment of the configuration provided with a recording medium which records a pattern-collating program according to the present invention.

This pattern-collating program is stored in a recording medium 90 such as a magnetic disk or a semiconductor memory. It is loaded from the recording medium to a data processing section 10c which is a computer processing apparatus and the respective functions described above are realized by controlling the operation of the data processing section 10c. As a result, the data processing section 10c executes the processing carried out by the data processing section 10, 10a and 10b in the first, second and third embodiments under the control of the pattern-collating program.

The present invention has been described so far while referring to the embodiments including the preferred embodiments. However, the present invention is not limited to these embodiments but can be executed while being modified in various manners within the scope of the technical concept.

As described so far, according to the pattern-collating device of the present invention, the similarity can be obtained using an estimation criterion without depending on the density of feature points, i.e., the probability that the examination target graphic to be compared, when it is one arbitrarily selected from all graphics assumed to be inputted, is consistent by chance. It is, therefore, possible to accurately identify a pattern even when there is a difference in the density of the feature points of the inputted graphic.

What is claimed is:

1. A pattern collating device for collating an examination target graphic with a model graphic, comprising:
    feature point pair formation means for making feature point pairs, each of which is composed of a feature point in said examination target graphic and a feature point in said model graphic which correspond to each other, said feature point in said examination target graphic which composes each of said feature point pair being selected from points which indicate feature of said examination target graphic, said feature point in said model graphic which composes each of said feature point pair being selected from points which indicate feature of said model graphic:
    probability calculation means for calculating a probability that a number of feature point pairs between an arbitrary graphic and said model graphic is not less than a number of said feature point pairs between said examination target graphic and said model graphic,
    similarity calculation means for calculating similarity between said examination target graphic and said model graphic on the basis of said probability.

2. The pattern collating device as set forth in claim 1, further comprising:
    feature quantity calculation means for calculating feature quantity between said examination target graphic and said model graphic; and
    consistency calculation means for calculating consistency of feature point pairs between said examination target graphic and said model graphic based on said number of feature point pairs between said examination target graphic and said model graphic and said feature quantity between said examination target graphic and said model graphic,
    wherein said probability calculation means calculates a probability that consistency between said arbitrary graphic and said model graphic is not less than said consistency between said examination target graphic and said model graphic, instead of said probability that said number of feature point pairs between said arbitrary graphic and said model graphic is not less than said number of said feature point pairs between said examination target graphic and said model graphic.

3. The pattern collating device as set forth in claim 2, further comprising:
    second feature quantity calculation means for calculating feature quantity between said model graphic and a graphic which is the same as said model graphic; and
    consistency calculation means for calculating consistency of feature point pairs between said model graphic and said graphic which is the same as said model graphic based on said number of feature point pairs between said model graphic and said graphic which is the same as said model graphic and said feature quantity between said model target graphic and said graphic which is the same as said model graphic,
    wherein said similarity calculation means calculates said similarity between said examination target graphic and said model graphic on the basis of said probability that consistency between said arbitrary graphic and said model graphic is not less than said consistency between said examination target graphic and said model graphic and a probability that said consistency between said model graphic and said graphic which is the same as said model graphic is less than said consistency between said examination target graphic and said model graphic.

4. The pattern collating device as set forth in claim 1, further comprising:
    feature quantity calculation means for calculating feature quantity difference of feature point pairs between said examination target graphic and said model graphic;
    means for reducing said number of feature point pairs between said examination target graphic and said model graphic to a number of feature point pairs of which said quantity difference is less than a predetermined value;
    means for reducing said number of feature point pairs between said arbitrary graphic and said model graphic by eliminating feature point pairs of which said quantity difference is not less than said predetermined value, and
    wherein said probability calculation means calculates a probability that said reduced number of feature point pairs between an arbitrary graphic and said model graphic is not less than said reduced number of feature point pairs between said examination target graphic and said model graphic, instead of said probability that said number of feature point pairs between said arbitrary graphic and said model graphic is not less than said number of said feature point pairs between said examination target graphic and said model graphic.

5. The pattern collating device as set forth in claim 4, wherein said quantity difference is a distance between feature points composing said feature point pair.

6. The pattern-collating device as set forth in any one of claims 1 to 5, wherein
    at least one of a fingerprint and a palm print is used as said examination target graphic and said model graphic.

7. A pattern collating method for collating an examination target graphic with a model graphic, comprising:
    a feature point pair formation step for making feature point pairs, each of which is composed of a feature point in said examination target graphic and a feature point in said model graphic which correspond to each other, said feature point in said examination target graphic which composes each of said feature point pair being selected from points which indicate feature of said examination target graphic, said feature point in said model graphic which composes each of said feature point pair being selected from points which indicate feature of said model graphic:
a probability calculation step for calculating a probability that a number of feature point pairs between an arbitrary graphic and said model graphic is not less than a number of said feature point pairs between said examination target graphic and said model graphic,
a similarity calculation step for calculating similarity between said examination target graphic and said model graphic on the basis of said probability.

8. The pattern collating method as set forth in claim 7, further comprising: a feature quantity calculation step for calculating feature quantity between said examination target graphic and said model graphic; and
a consistency calculation step for calculating consistency of feature point pairs between said examination target graphic and said model graphic based on said number of feature point pairs between said examination target graphic and said model graphic and said feature quantity between said examination target graphic and said model graphic,
wherein said probability calculation step calculates a probability that consistency between said arbitrary graphic and said model graphic is not less than said consistency between said examination target graphic and said model graphic, instead of said probability that said number of feature point pairs between said arbitrary graphic and said model graphic is not less than said number of said feature point pairs between said examination target graphic and said model graphic.

9. The pattern collating method as set forth in claim 8, further comprising:
a second feature quantity calculation step for calculating feature quantity between said model graphic and a graphic which is the same as said model graphic; and
a consistency calculation step for calculating consistency of feature point pairs between said model graphic and said graphic which is the same as said model graphic based on said number of feature point pairs between said model graphic and said graphic which is the same as said model graphic and said feature quantity between said model target graphic and said graphic which is the same as said model graphic,
wherein said similarity calculation step calculates said similarity between said examination target graphic and said model graphic on the basis of said probability that consistency between said arbitrary graphic and said model graphic is not less than said consistency between said examination target graphic and said model graphic and a probability that said consistency between said model graphic and said graphic which is the same as said model graphic is less than said consistency between said examination target graphic and said model graphic.

10. The pattern collating method as set forth in claim 7, further comprising:
a feature quantity calculation step for calculating feature quantity difference of feature point pairs between said examination target graphic and said model graphic;
a step for reducing said number of feature point pairs between said examination target graphic and said model graphic to a number of feature point pairs of which said quantity difference is less than a predetermined value;

a step for reducing said number of feature point pairs between said arbitrary graphic and said model graphic by eliminating feature point pairs of which said quantity difference is not less than said predetermined value, and
wherein said probability calculation step calculates a probability that said reduced number of feature point pairs between an arbitrary graphic and said model graphic is not less than said reduced number of feature point pairs between said examination target graphic and said model graphic, instead of said probability that said number of feature point pairs between said arbitrary graphic and said model graphic is not less than said number of said feature point pairs between said examination target graphic and said model graphic.

11. The pattern collating method as set forth in claim 10, wherein said quantity difference is a distance between feature points composing said feature point pair.

12. The pattern-collating method as set forth in any one of claims 7 to 11, wherein
at least one of a fingerprint and a palm print is used as said examination target graphic and said model graphic.

13. A computer-readable medium on which a computer program is recorded, said computer program comprising instructions for having a computer executing a pattern collating method for collating an examination target graphic with a model graphic, comprising:
a feature point pair formation step for making feature point pairs, each of which is composed of a feature point in said examination target graphic and a feature point in said model graphic which correspond to each other, said feature point in said examination target graphic which composes each of said feature point pair being selected from points which indicate feature of said examination target graphic, said feature point in said model graphic which composes each of said feature point pair being selected from points which indicate feature of said model graphic:
a probability calculation step for calculating a probability that a number of feature point pairs between an arbitrary graphic and said model graphic is not less than a number of said feature point pairs between said examination target graphic and said model graphic,
a similarity calculation step for calculating similarity between said examination target graphic and said model graphic on the basis of said probability.

14. The computer-readable medium as set forth in claim 13, wherein said method further comprises:
a feature quantity calculation step for calculating feature quantity between said examination target graphic and said model graphic; and
a consistency calculation step for calculating consistency of feature point pairs between said examination target graphic and said model graphic based on said number of feature point pairs between said examination target graphic and said model graphic and said feature quantity between said examination target graphic and said model graphic,
wherein said probability calculation step calculates a probability that consistency between said arbitrary graphic and said model graphic is not less than said consistency between said examination target graphic and said model graphic, instead of said probability that said number of feature point pairs between said arbitrary graphic and said model graphic is not less than said number of said feature point pairs between said examination target graphic and said model graphic.

15. The computer-readable medium as set forth in claim 14, wherein said method further comprises:
- a second feature quantity calculation step for calculating feature quantity between said model graphic and a graphic which is the same as said model graphic; and
- a consistency calculation step for calculating consistency of feature point pairs between said model graphic and said graphic which is the same as said model graphic based on said number of feature point pairs between said model graphic and said graphic which is the same as said model graphic and said feature quantity between said model target graphic and said graphic which is the same as said model graphic,
- wherein said similarity calculation step calculates said similarity between said examination target graphic and said model graphic on the basis of said probability that consistency between said arbitrary graphic and said model graphic is not less than said consistency between said examination target graphic and said model graphic and a probability that said consistency between said model graphic and said graphic which is the same as said model graphic is less than said consistency between said examination target graphic and said model graphic.

16. The computer-readable medium as set forth in claim 13, wherein said method further comprises:
- a feature quantity calculation step for calculating feature quantity difference of feature point pairs between said examination target graphic and said model graphic;
- a step for reducing said number of feature point pairs between said examination target graphic and said model graphic to a number of feature point pairs of which said quantity difference is less than a predetermined value;
- a step for reducing said number of feature point pairs between said arbitrary graphic and said model graphic by eliminating feature point pairs of which said quantity difference is not less than said predetermined value, and
- wherein said probability calculation step calculates a probability that said reduced number of feature point pairs between an arbitrary graphic and said model graphic is not less than said reduced number of feature point pairs between said examination target graphic and said model graphic, instead of said probability that said number of feature point pairs between said arbitrary graphic and said model graphic is not less than said number of said feature point pairs between said examination target graphic and said model graphic.

17. The computer-readable medium as set forth in claim 16, wherein said quantity difference is a distance between feature points composing said feature point pair.

18. The computer-readable medium as set forth in any one of claims 13 to 17, wherein
- at least one of a fingerprint and a palm print is used as said examination target graphic and said model graphic.

* * * * *